July 17, 1956 P. H. TRICKEY 2,754,946
POWER TRANSMISSION
Filed Dec. 13, 1950
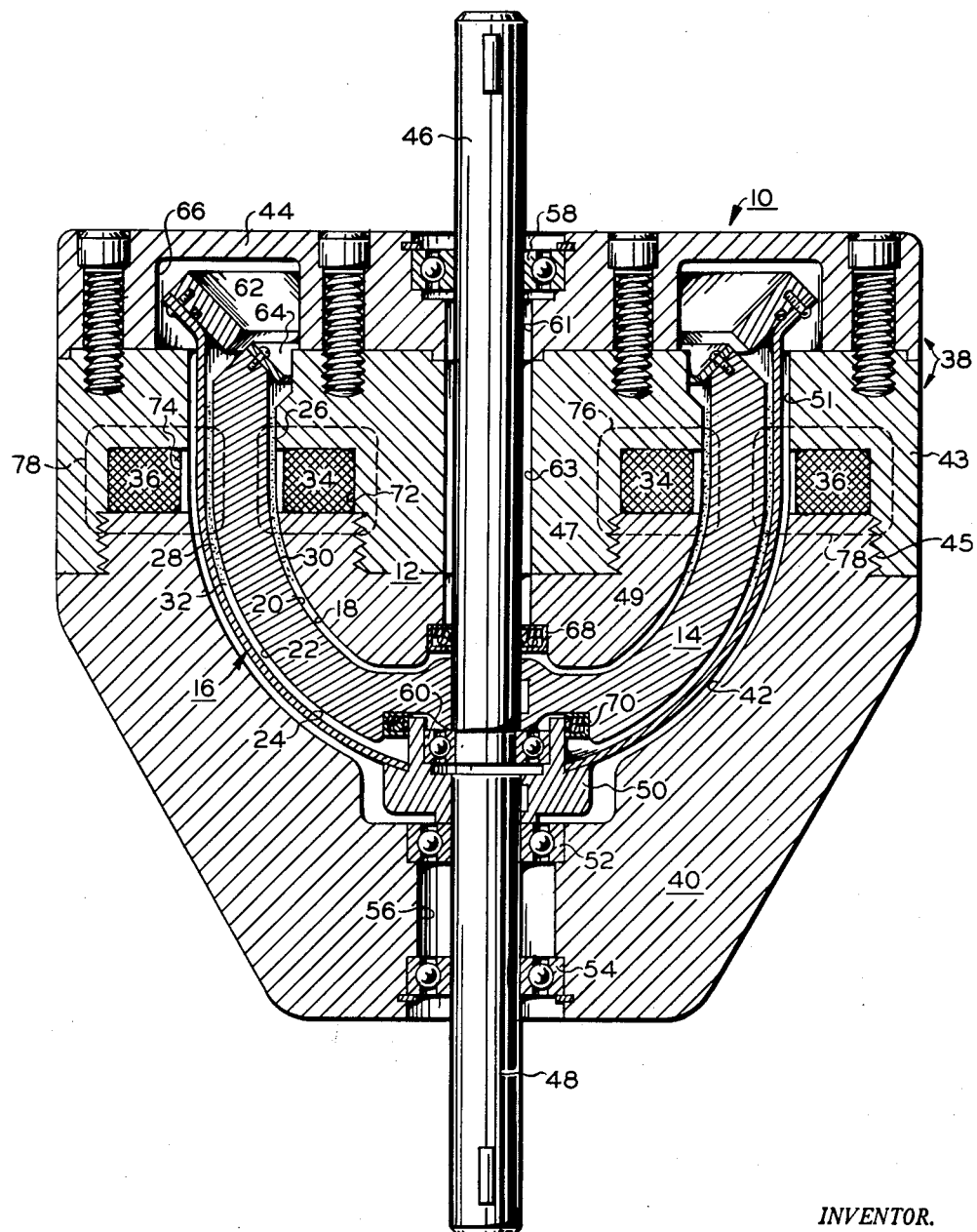
INVENTOR.
PHILIP H. TRICKEY
BY
ATTORNEY

United States Patent Office 2,754,946
Patented July 17, 1956

2,754,946

POWER TRANSMISSION

Philip H. Trickey, Webster Groves, Mo., assignor to Vickers Incorporated, Detroit, Mich., a corporation of Michigan Application December 13, 1950, Serial No. 200,575

4 Claims. (Cl. 192—21.5)

This invention relates to power transmission and more particularly to magnetic particle coupling devices.

Magnetic particle coupling devices such as clutches, brakes, dynamometers, variable drives, etc., of conventional design will not operate on a vertical axis as well as they do on a horizontal axis because of particle settling and time delay. When operated on a vertical axis the magnetic particles fall to the bottom of and out of a cylindrical gap when the moving coupling members are at a standstill or at low idling speed when de-energized. As a result, when the clutch is operated and the working gap is magnetized the particles will fail to be drawn into the gap resulting in clutching failure or they will be drawn into the gap very slowly causing an unreasonable time delay in the clutching action.

An object of the present invention is to provide a new and useful magnetic coupling device.

Another object of the invention is to provide a new and useful magnetic coupling device which will operate effectively on a vertical axis.

Further objects and advantages of the present invention will be apparent from the following description, reference being had to the accompanying drawing wherein a preferred form of the present invention is clearly shown.

In the drawing:

The single figure drawing is a sectional view of a combination clutch and brake.

In accordance with the invention a magnetic coupling device for vertical operation may be provided with relatively rotatable coupling members having spaced concentric coupling surfaces defining a magnetic working gap or gaps wherein magnetic particles transmit torque between the coupling surfaces in response to magnetic excitation, the surfaces defining the gap having sloping portions to facilitate distribution of the magnetic particles into the working portion of the gap. For example, as shown in the drawing a magnetic clutch and brake apparatus 10 is provided with relatively rotatable coupling members 12, 14, and 16 having spaced concentric cup-shape surfaces 18, 20, 22, and 24 defining magnetic working gaps 30 and 32 wherein quantities of magnetic particles 26 and 28 are effective to transmit torque for clutching and braking action between adjacent surfaces in response to magnetic excitation across the gaps by suitable means such as the exciting coils 34 and 36.

The rotatable elements are enclosed in a housing 38 formed from a lower section 40 with a cup-shaped inner surface 42 facing upward, a ring-shaped mid-section 43 intimately joined to the section 40 at the threaded joint 45, and a top section 44 suitably secured to the mid-section 43. Member 12, formed of two parts 47 and 49, is secured to the underside of the top 44 and its external cup-shaped surface 18 extending across the parts 47 and 49 cooperates with the cup-shaped surface 42 and the inner surface 51 of the mid-section 43 to define an internal space shaped substantially like a cup in which the rotating elements 14 and 16 are concentrically disposed to rotate with their respective shafts 46 and 48. The relation of the rotating coupling members 14 and 16 is that of driven and driving members respectively and will be so referred to hereinafter. Thus, the shaft 48 may be connected to a prime mover (not shown) while the shaft 46 may be connected to a load (not shown).

The driving member 16 is a relatively thin cup-shaped shell of magnetic material mounted for rotation with the shaft 48 through a hub member 50 keyed to the shaft 48 which is journalled for rotation in bearings 52 and 54 mounted at opposite ends of a central bore 56 in the member 40.

The driven member 14 is also cup-shaped but with relatively thick walls made of magnetic material, and is keyed to rotate with the shaft 46, which is carried by bearings 58 and 60 mounted in the top member 44 and the hub member 50 respectively, and extends through bores 61 and 63.

It will be seen from the drawing that the driving and driven members 16 and 14 are concentric around the axis of the vertical shafts 46 and 48, and are spaced from each other and from the members 12 and 40, thus being freely rotatable in the space defined by the members 12 and 40. The inner surface 24 of the driving member 16 is spaced from the outer surface 22 of the driven member 14 to form the gap 32 in which the magnetic particles 28 are disposed, while the inner surface 20 of the driven member 14 is spaced from the outer surface 18 of the member 12 by the gap 30 wherein the magnetic particles 26 are located.

Particle retaining rings 62 and 64 are secured to the rims of the rotary members 16 and 14 respectively, which extend into a circular channel in the underside of the top member 44. Suitable seals are provided at strategic points to prevent undesirable migration of magnetic particles, for example, as indicated at 68 and 70.

Annular channels 72 and 74 are provided for receiving the exciting coils 34 and 36 respectively, which are wound in such a manner as to produce toroidal magnetic fields as shown by the dotted lines 76 and 78, which indicate the mean magnetic paths for the respective coils in cross section. In order to complete the magnetic circuits the sections 40, 43, and 12 are made of suitable magnetic material such as iron, while the top section 44 is made of nonmagnetic material to avoid undesirable magnetic short circuit leakage. Energization for the exciting coils 34 and 36 may be furnished from any suitable current source (not shown) for example, a battery or generator connected to the respective coils through suitable switches and controls (not shown). The magnetic particles 26 and 28 may be of any suitable material, for example, powdered iron, and may be unadulterated or mixed with suitable liquids or particles of other materials, such as mixtures of iron particles and oil, or iron particles and graphite. Iron particles known commercially as Carbonyl E have been used extensively in magnetic particle coupling devices.

With all the rotating elements at standstill and the coils 34 and 36 de-energized, the magnetic particles 26 and 28 will be disposed along the sloping portion and the lower portion of the respective gaps 30 and 32. When the driving shaft 48 is rotated at sufficient speed, centrifugal force will cause the particles 28 to move upward into optimum operating positions in the gap 32 due to the unimpeded smooth sloping contour of the inner surface 24 of the driving member 16. This position of the particles is illustrated in the drawing. Once this position is attained, a force-transmitting bond between the driving and driven members 16 and 14 may be established by exciting the gap 32 and magnetizing the particles 28 with a magnetic field along the path 78 generated by the coil 36 upon application of current therethrough. Because of its thin wall, the portion of the driving member 16 in the magnetic path saturates rapidly and has a negligible magnetic shunting effect. Depending on the current value and load extent, the coupling bond between the members 16 and 14 will effect either synchronous or nonsynchronous operation between the members, non-slip or slip operation.

When the driven member 14 is in motion, the magnetic particles 26 are forced into the upper section of the gap 30 by centrifugal force, and upon energization of the coil 34, the magnetic particles will be excited to form a force-transmitting bond between the coupling surfaces 18 and 20 thus applying braking force to the member 14.

Thus in both of the gaps 30 and 32 the movement of the magnetic particles into operative position due to centrifugal force is greatly facilitated by the unimpeded outwardly and upwardly curving contour of the inner surfaces 20 and 24, each of which forms one side of the respective gaps.

It will be appreciated that in the particular embodiment disclosed, clutch operation alone can be had and the specific braking illustrated may be dispensed with by omitting the magnetic particles 26 and the brake exciting coil 34.

The present invention is not restricted by the particular embodiment shown, and the design and details thereof are adaptable to modification and parts inversion, for example the magnetizing elements may be coils as shown or fixed or variable permanent magnets, any of which may be carried by the rotating members or by nonrotating structure as shown.

While the form of embodiment of the invention as herein disclosed constitutes a preferred form, it is to be understood that other forms might be adapted, all coming within the scope of the claims which follow.

What is claimed is as follows:

1. A magnetic coupling device comprising a pair of coupling members relatively rotatable around a substantially vertical axis, one member having an inner surface, the other member having an outer surface concentrically spaced from said inner surface to form a working gap therebetween, means for establishing a magnetic field across said gap, and magnetic particles for operative disposition in said gap and responsive to said field for forming a force-transmitting bond between said members, said inner surface having an outwardly and upwardly smoothly sloping contour with an upwardly increasing slope ending in an extended vertical section of substantial axial length as compared to the rest of said inner surface to facilitate the movement of the magnetic particles into operative position by centrifugal forces developed in response to rotation of said one member.

2. A magnetic coupling device comprising a pair of concentrically spaced coupling members relatively rotatable around a substantially vertical axis, one of said members having a cup-shaped inner surface, the other member having an outer surface radially spaced from said inner surface to form a gap therebetween, means for establishing a magnetic field across said gap, and magnetic particles in said gap for forming a force-transmitting bond between said members in response to said field, said inner surface having a contour which curves outwardly and upwardly terminating in an upper section parallel to said axis for facilitating optimum distribution of said particles in said gap by centrifugal forces developed in response to rotation of said one member, said field establishing means being operable to confine substantially the entire magnetic field to that part of the space between the coupling members which is coextensive with said parallel portion only.

3. A magnetic coupling device comprising a pair of concentrically spaced coupling members relatively rotatable around a substantially vertical axis, one of said members having a cup-shaped inner surface, the other member having an outer surface radially spaced from said inner surface to form a gap therebetween, means for establishing a magnetic field across said gap, and magnetic particles in said gap for forming a force-transmitting bond between said members in response to said field, said inner surface having an upward slope terminating in an extended section parallel to said axis for facilitating optimum distribution of said particles in said gap by centirfugal forces developed in response to rotation of said one member, said parallel section being extended axially to define with said outer surface sufficient gap space coextensive with said parallel section to operatively accommodate at least a major portion of said particles.

4. A magnetic coupling device comprising a housing having spaced internal surfaces defining a cup-shaped space, concentrically-spaced, relatively-rotatable cup-shaped inner and outer coupling members mounted in nested relation for rotation within said cup-shaped space, magnetizing means carried by said housing and encircling the outer coupling member, magnetizing means carried by said housing and encircled by said inner member, said inner member and a portion of said internal surfaces being spaced to define a magnetic gap therebetween, said coupling members being spaced to define a magnetic gap therebetween, and magnetic particles in said gaps for forming force-transmitting bonds between said members and between said inner member and the housing in response to said magnetizing means, the inner and outer members having with respect to their rotational axis outwardly and endwardly sloping surfaces terminating in surface sections parallel to said axis.

References Cited in the file of this patent

UNITED STATES PATENTS

| 1,338,122 | Carestedt | Apr. 27, 1920 |
| 1,940,918 | Petroni et al. | Dec. 26, 1933 |
| 2,519,449 | Findley | Aug. 22, 1950 |
| 2,541,831 | Prince | Feb. 13, 1951 |
| 2,549,738 | Winther | Apr. 17, 1951 |
| 2,575,360 | Rabinow | Nov. 20, 1951 |
| 2,603,103 | Sohon et al. | July 15, 1952 |
| 2,643,748 | White | June 30, 1953 |

OTHER REFERENCES

Characteristics of Some Magnetic-Fluid Servomechanisms, 19 pages. (Copy in Division 12.) Feb. 16, 1950.

Technical Report 1213, National Bureau of Standards, Washington, D. C.

Contributed Original Research; Induced Fibration of Suspensions, Journal of Applied Physics, vol. 20, No. 12, December 1949.